United States Patent
Yamada

(10) Patent No.: US 6,522,997 B1
(45) Date of Patent: Feb. 18, 2003

(54) SIMULATION METHOD OF SPUTTERING

(75) Inventor: Hiroaki Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 469 days.

(21) Appl. No.: 08/953,998

(22) Filed: Oct. 20, 1997

(30) Foreign Application Priority Data

Oct. 21, 1996 (JP) ................................ 8-277752

(51) Int. Cl.$^7$ ................................ G06G 7/48

(52) U.S. Cl. .................... 703/6; 703/3; 703/4

(58) Field of Search ............... 364/578; 395/500.27, 395/500.3; 703/6, 3–4

(56) References Cited

U.S. PATENT DOCUMENTS 5,751,607 A * 5/1998 Ohta ........................ 364/578

FOREIGN PATENT DOCUMENTS

JP          5568296         3/1996

OTHER PUBLICATIONS

Malaurie et al., Numerical simulation of the characterictics of the different metallic species falling on the growing thin film in d.c. magnetron sputtering; Thin Solid Films; pp. 305–316; Sep. 30, 1996.*

Printout (Sep. 25, 2002) from Reaction Engineering International (http://www.rxneng.co.kr/faq2.htm; pp. 1–6.*

Smy et al.,; A simulation study of long throw sputtering for diffusion barrier deposition into high aspect vias and contacts; IEEE Trans. Electron Devices; Jul. 1998.*

Jones et al., Monte Carlo Investigation of Electron–Impact Ionization in Liquid Xenon, Phys. Rev. B, vol. 48, #13, pp. 9382–9387, Oct. 1993.*

Yamada et al.: A Sputter Equipment Simulation System Including Molecular Dynamical Target Atom Scattering Model; IEEE—IEDM; pp. 4.5.1–4.5.4, 1995.*

The VNR Concise Encyclopedia of Mathematics; Van Nostrand Reinhold Co.; pp. 626–627 & 652–653, 1977.*

Encyclopedia of Physics; VCH Publishers, Inc.; pp. 771–774, 1990.*

Numerical Methods for Scientists and Engineers; Dover Publications; pp. 132–145 & 227–231, 1973.*

Chandler; "Introduction to Modern Statistical Mechanics"; Oxford University Press; pp. 159–187, 1987.*

Hahn et al.; "Statistical Models in Engineering"; John Wiley & Sons; pp. 236–253, 1967.*

(List continued on next page.)

Primary Examiner—Hugh M. Jones
(74) Attorney, Agent, or Firm—Sughrue Mion, PLLC

(57) ABSTRACT

The method includes the steps of: calculating a direction-dependent distribution of ejected particles from a target, dividing a range of the vertical angle $\theta$, with respect to a direction perpendicular to the surface of the target, into sections of an equal interval, counting a number of the ejected particles for every section of the vertical angle $\theta$, and calculating a vertical distribution function by interpolating the counted numbers of the ejected particles as a function of the vertical angle $\theta$. The method also includes determining values of the vertical angle $\theta$ likely to emerge in a random process of a particle ejection from the target using the vertical distribution function based on a rejection method, determining values of the horizontal angle $\phi$, measured from a direction in the surface plane of the target, likely to emerge in a random process of a particle ejection from the target, and calculating tracks of sputtered particles in a sputtering arrangement using the values of the vertical angles and the horizontal angles determined by the third step and the fourth step in accordance with the Monte Carlo method.

6 Claims, 3 Drawing Sheets

OTHER PUBLICATIONS

Brennan; "Electron Transport Phenomena in Crossed Electric and Magnetic Fields"; Ph.D. Thesis—Flinders University of South Australia; table of contents and pp. 1.1–2.6, Mar. 1986.*

Microsoft Press—Computer Dictionary; 3rd edition; Microsoft Press; p. 314, 1997.*

Yamada, H et al: "A practical sputter equipment simulation system for aluminum including surface diffusion model". 1996 International Conference on Simulation of Semiconductor Processes and Devices. Sispad '96 (IEEE Cat. No. 96TH8095), Proceedings of International Conference on Simulation of Semiconductor Processes and Devices, Tokyo, Japan, 2–4 Sep. 1996, pp. 77–78, XP000856959 1996, Tokyo, Japan, Japan Soc. Appl. Phys., Japan ISBN : 0/7803–2745–4.

Yamada, H. et al: "A sputter equipment simulation system including molecular dynamical target atom scattering model". International Electron Devices Meeting Technical Digest (Cat. No.95CH35810), Proceedings of International Electron Devices Meeting, Washington, DC, USA, 10–13 Dec. 1995, pp. 93–96, XP002126194 1995, New York, NY, USA, IEEE, USA ISBN: 0–7803–2700–4.

Yamada, H et al: "Practical Monte Carlo sputter deposition simulation with quasi–axis–symmetrical (QAS) approximation". International Electron Devices Meeting 1994. Technical Digest (Cat. No. 94CG35706), Proceedings of 1994 IEEE International Electron Devices Meeting, San Francisco, CA, USA, Dec. 11–14, 1994, pp. 553–556, XP002126195 1994, New York, NY IEEE, USA ISBN: 0–7803–2111–1.

* cited by examiner

SIMULATION METHOD OF SPUTTERING

BACKGROUND OF THE INVENTION

1. Field of the Invention

The present invention relates to a method of simulation and particularly relates to the method of simulating a target in a sputtering arrangement and also to the method of simulating a track of a sputtered particle in the arrangement.

2. Description of the Related Art

In the field of semiconductor integrated circuits, there has been a growing trend toward the design of high-density integrated circuits, as the technology of integrating electronic circuits progresses. This trend has brought about an urgent requirement to develop a technique for growing a semiconductor thin film in a finely formed contact hole of a highly integrated IC.

Optimization of a sputtering arrangement is imperative in order to meet the above requirement. Since the actual construction of and experimentation with the arrangement of the sputtering apparatus are problematic from the viewpoint of cost and development time, the optimization has been attempted by means of simulation.

In connection with the design of the sputtering arrangement, it has been required to improve the direction-dependent distribution characteristic of the particles ejected from the target, as well as to improve the shapes of components of the arrangement, such as a collimator. These improvements have been desired more anxiously, particularly as a high aspect ratio of a circuit element is required for fine-structuring of an IC. Hereinafter, the direction-dependent distribution of the particles ejected from the target is referred to as an angular distribution.

There have been presented methods of simulating the angular distribution using a method of the molecular dynamics (MD). Yamada H., the present inventor, has invented such a simulation method of sputtering, which method was disclosed in Japanese Patent Application. No. 55682/96 (filed by the present applicant) filed before the present application. Since the simulation method is relevant to the present invention, it will be referred to, hereinafter, as Yamada's former method.

FIG. 1 is a flow chart to illustrate Yamada's former method.

Referring to FIG. 1, the method includes steps P1, P2 and S5. In step P1, an angular distribution of the particles ejected from a target is calculated using the MD method and stored in a data file. In step P2, the angular distribution of ejection is successively read out. In step S5, a track of the sputtered particle in the sputter arrangement is calculated from the vertical and horizontal components of the direction of ejection by means of the Monte Carlo (MC) method, wherein the angular distribution of ejected particles read out in Step P2 is taken as an initial value.

In step P1, the velocity of the ion incident on the target is calculated from the applied voltage, and the surface temperature of the target is calculated by means of thermoanalysis. The initial velocity of the atoms in the interior of the target is derived from the surface temperature. The track of an interior atom of the target is calculated by means of the MD method on the basis of the derived initial velocity (step S11). The track of an atom farther than a cut-off distance from the surface of the target is next extracted as a sputtered atom (step S12), the horizontal and vertical components of the ejected directions of the sputtered atoms are extracted (step P13), and are stored in a data file (step S14). The steps S11–S14 are repeated until the number of data points reachs a predetermined number-N (step S15). The number of extracted sputtered atoms, i.e., the number of ejected angles of the particles N is of the order of 100–200 in order for the calculation to be carried out within a practical calculation time.

Next, the ejected direction is successively read out in step P2. In this step, the ejection angle data is read out successively from the data file starting with #01 data (step P21). It is judged then whether the number of the read-out data n reaches N (step P22). The read-out ejection angle data is successively served to the calculation of the tracks of sputtered atoms in the sputtering arrangement (step S51) until the number of data points read-out reaches N. Upon the number reaching N, #01 data is employed again for the calculation of the tracks (step P23), and the N data are repeatedly employed for the calculation of the tracks of the sputtered atoms.

The tracks of the sputtered particle in the sputtering apparatus are calculated by applying the MC method to each of the ejection angle data. In this calculation, the collision of the particles through a central force of a Lennard-Jones type potential and the trapping of the sputtered atom by the collimator and the wall of the arrangement are taken into account (step S51).

Finally, of the sputtered particles that have kept the tracks thus calculated, the particles, which arrive at a specific region on a wafer, are extracted (steps S52, S53). The shape of the region where the particles are actually to arrive is then calculated in step S6 with the aid of the string model or the like.

In this calculation, steps P21 to S53 are repeated until M ejection angle data are served to the MC calculation (step S54), wherein M is the number of the ejection angle data desirable to minimize the random number error in the MC calculation. M need be of the order often millions. Here, the random number error refers to an error originating from the deviation from a result of calculation carried out on the assumption of an infinite number of random numbers.

In the foregoing method of simulation, substantial sampling errors in directional components (direction cosines with respect to x-, y- and z-axes) of the possible tracks of the sputtered particles at their ejection points depend on the number of ejection angle data N.

Since the value of N, however, is taken as small as 100–200 because of the limitation in practical calculation time, a random number error is as large as $1/N^{1/2}$ ($\cong 10^{-1}$) can occur in this case. As a result, the calculated shape of the formed film becomes deformed due to a 20 to 30% error as compared with an ideal shape (the shape assumed in the case of a negligible-random number error) of the film.

The problem to be solved by the present invention is summarized as follows:

The foregoing method of simulation needs ejection angle data of the order of ten millions to be taken into the calculation (the desirable number of the ejection angle data to be taken into calculation will be hereinafter denoted as M) in order to minimize the random number error. In addition, because the sampling error decreases as N is increased, it is advantageous to make the number of the ejection angle data N as great as possible in order to minimize the sampling error. (The sampling error refers to an error which is likely to occur when directional components of the possible tracks of the particles are sampled at their ejected points). The value of the ejection angle data N, however, needs to be kept as small as 100–200 because of the limitation in calculation time, as described above. Consequently, a problem in Yamada's former method has been that a large random number error takes place from such a small value of N.

SUMMARY OF THE INVENTION

It is an object of the present invention to provide a method of simulating sputtering by which a random number error can be reduced and thus a film with a shape of a precise size can be formed by sputtering.

In order to realize the above object, the present invention is directed to calculating an direction-dependent distribution of ejected particles, effecting a calculation of tracks of the sputtered particles according to the MC method within a practically performable time and accuracy and obtaining an accurate shape of a produced film.

In order to attain the objects of the invention, the method of simulating sputtering according to the present invention, comprises:

a first step of calculating a direction-dependent distribution of ejected particles from the target;

a second step of dividing a range of the vertical angle $\theta$ into sections of an equal interval, counting a number of the ejected particles for every section of the vertical angle $\theta$, and calculating a vertical distribution function by interpolating the counted numbers of the ejected particles as a function of the vertical angle $\theta$, a third step of determining values of said vertical angle $\theta$ likely to emerge in a random process of a particle ejection from the target using the vertical distribution based on the rejection method, a fourth step of determining values of the horizontal angle $\phi$ likely to emerge in a random process of a particle ejection from said target, and a fifth step of calculating tracks of sputtered particles in a sputtering arrangement using the values of said vertical angles and said horizontal angles determined by the third step and the fourth step in accordance with the Monte Carlo method.

The third step preferably includes:

a step of generating sets of random numbers, each set consisting of two random numbers, a first random number being for designating a value of the vertical angle $\theta$, and a second random number being for comparison with a value of the vertical distribution function for a vertical angle designated by the first random number;

a step of comparing said second random number with a value of the vertical distribution function for a vertical angle designated by the first random number, and judging whether or not the second random number is equal to or less than said value of the vertical distribution function; and a step of accepting the first random number as a vertical angle likely to emerge if the second random number is equal to or less than the value of the vertical distribution function for the designated vertical angle and rejecting the first random number if the second random number is more than the value of the vertical distribution function for the designate vertical angle.

The fourth step preferably includes a step of designating the horizontal angle by uniform random numbers when it is conditioned that a particle is ejected from said target in an equal probability for all values of said horizontal angle $\phi$ at a fixed value of $\theta$.

In this case, the vertical distribution function is preferably calculated by integrating a vertical distribution function for an arbitrary given horizontal angle, with respect to $\phi$.

The method of simulating preferably further includes a step of judging the number of the vertical angles used in calculation according to the Monte Carlo (MC) method, and if the judged number of said vertical angles is less than a predetermined number M, the designations of the vertical angle and the horizontal angle by the steps 3 to 5 are repeated until the number M is attained.

The number M is determined so as to put the random number error occurring in the MC calculation in a minimum tolerable, preferably determined to be at least ten millions.

By the constituent features particularly of the second and third steps above, a large number (M) of the ejection angle data can be generated so as to adapt to the distribution function. The large number of the ejection angle data allow the MC calculation with a minimum random-number error. The distribution function can be obtained by means of the interpolation method from a comparatively small number of the ejection angle data that can be calculated within a practically allowable time. Consequently, the present invention provides a method to generate a large number of ejection angle data, which represent likely directions of ejection of particles in the random ejection process, so as to adapt to the distribution function calculated from a small number of ejection angle data.

By virtue of the above-described constituent features, the present invention offers the advantage of significantly reducing the random number error, and allowing the precise shape of a produced film to be determined.

The above object, features and advantages of the present invention will become apparent from the following description referring to the accompanying drawings which illustrate an example of a preferred embodiment of the present invention.

DESCRIPTION OF THE PREFERRED EMBODIMENT

A detailed embodiment will be explained hereinafter referring to FIG. 2.

Before proceeding to explaining the embodiment of the present method, we define several terms that will be used throughout the present Specification.

We describe an ejected direction of a particle from the target with a polar or spherical coordinate system ($\theta$, $\phi$). Here, $\theta$ denotes an angle of the ejected direction with respect to the z-axis, and $\phi$ denotes an angle of the ejected direction around the z-axis, i.e., an angle of the intersection line with respect to the x-axis, the intersection line being an intersection of the xy-plane and the plane which includes both z-axis and the ejection direction. The x-axis is an axis arbitrary determined on the xy-plane. The angles $\theta$, $\phi$ will hereinafter be referred to as a vertical angle and a horizontal angle.

We further define a distribution function $f(\theta, \phi)$ so that the number of particles ejected within a solid angle $d\Omega = \sin\theta \cdot d\theta \cdot d\phi$ in the direction $(\theta, \phi)$ is $$f(\theta, \phi) \sin\theta \cdot d\theta \cdot d\phi. \quad (1)$$

Under the definitions above, we define a set of values of $f(\theta, \phi)$ for various values of $\phi$ at an arbitrary value of $\theta$, say $\theta_k$, $$f(\theta_k, \phi_1), f(\theta_k, \phi_2), f(\theta_k, \phi_3), f(\theta_k, \phi_4), \quad (2)$$

as a horizontal distribution at an angle $\theta_k$.

Total number of the particles ejected in the directions making an angle $\theta$ with the z direction is $$F(\theta) = \int f(\theta, \phi) \sin\theta d\phi. \quad (3)$$

We define a set of values of $F(\theta)$ for various values of $\theta$, $$F(\theta_1), F(\theta_2), F(\theta_3), F(\theta_4), \quad (4)$$

as a vertical distribution of the ejected particles.

In the present embodiment, it is assumed, in addition, that a bombarding gas particle (an ambient gas molecule) is incident perpendicularly (in the z direction) onto the surface of the target (the xy plane) and that the arrangement of atoms in the surface of the target is isotropic.

Then, $f(\theta, \phi)$ will be independent of $\phi$ because of the geometrical symmetry of the sputtering condition, and thus the horizontal distribution at $\theta$, i.e., $f(\theta_k, \phi_1), f(\theta_k, \phi_2), f(\theta_k, \phi_3), f(\theta_k, \phi_4), \ldots$, will be constant, depending solely on $\theta$.

Figure 1:
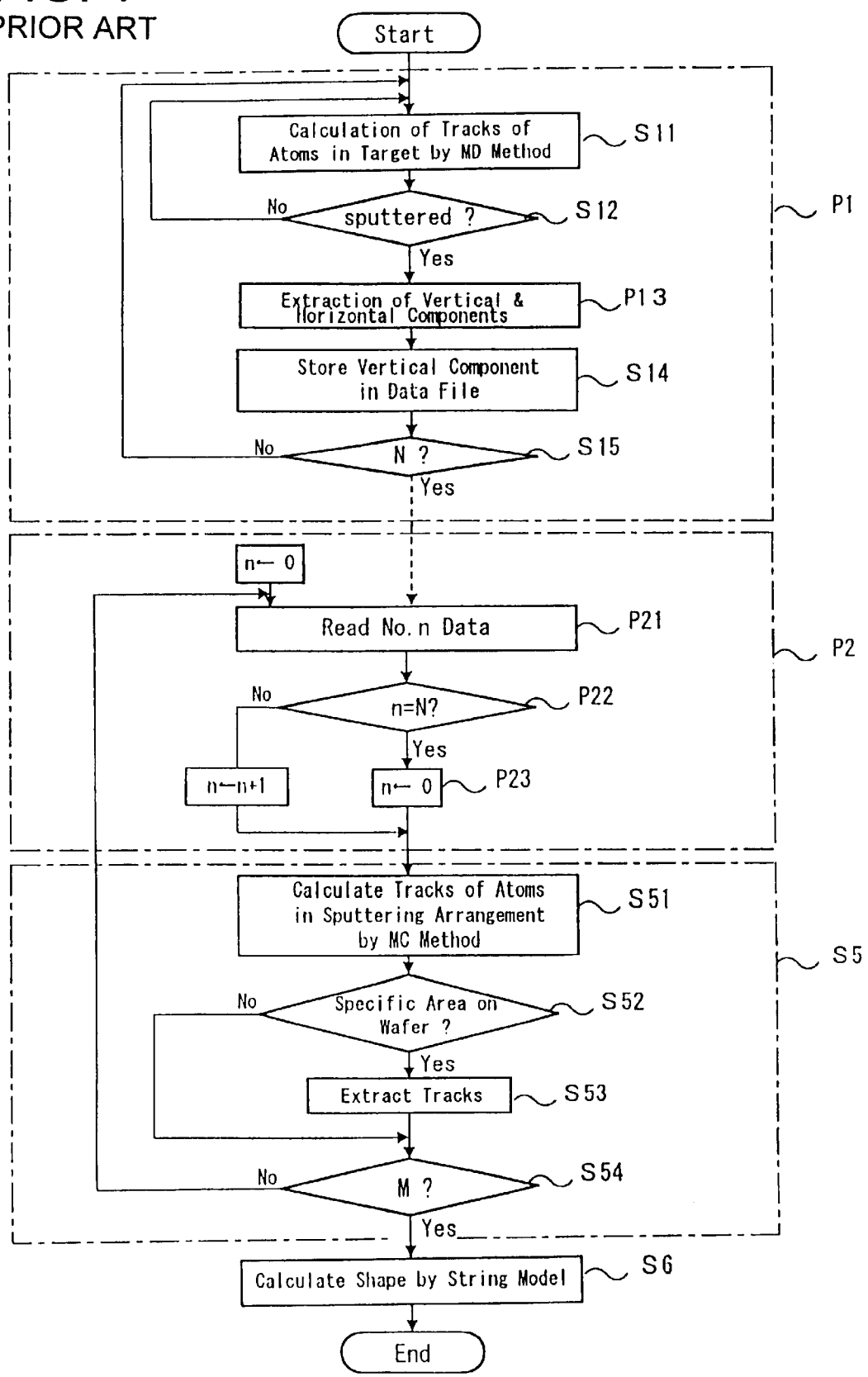
FIG. 1 is a flow chart illustrating the Yamada's former method.
Figure 2:
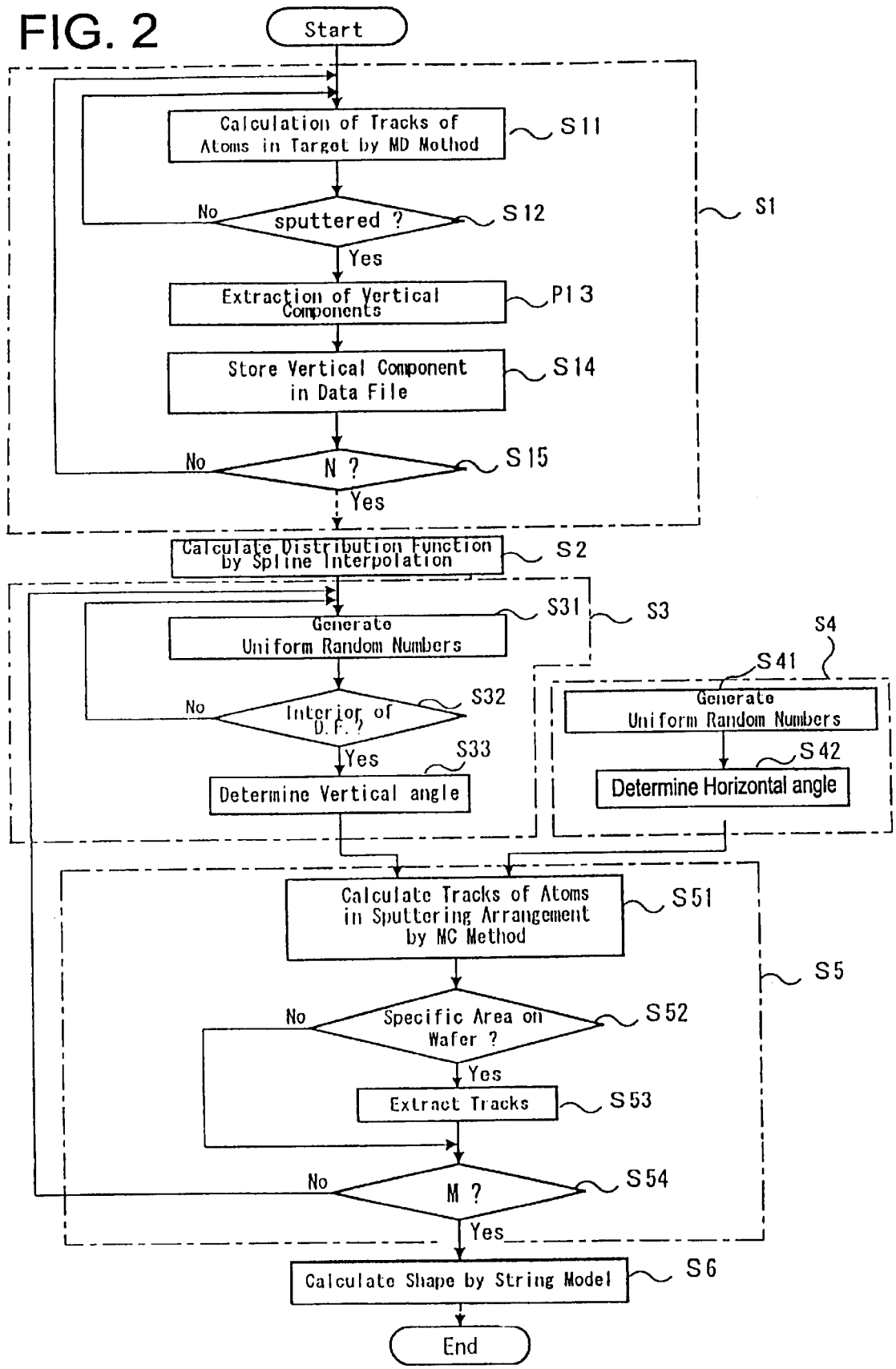
FIG. 2 is a flow chart illustrating an embodiment of the simulation method according to the present invention.

FIG. 2 is a flow chart illustrating an embodiment of the simulation method according to the present invention.

The method comprises five steps, S1–S5. The direction-dependent distribution of the particles ejected from the target, i.e., the distribution in numbers of the particles ejected in various directions is calculated in step S1. In this calculation, tracks of the target atoms within the target material before the ejection is calculated by means of the MD method.

In step S2, the numbers of the ejected particles are counted for predetermined intervals of $\theta$ and the vertical distribution function $F(\theta)$ is calculated through the interpolation method, i.e., by interpolating the counted numbers of ejected particles for individual intervals of $\theta$.

In step S3, values of the vertical angle $\theta$, which are likely to emerge in a random process of a particle ejection from said target, are determined using the vertical distribution function $F(\theta)$ based on the rejection method.

In step S4, horizontal angles $\phi$ likely to emerge are designated by uniform random numbers on the assumption that a particle is ejected from said target in an equal probability for all values of said horizontal angle $\phi$ at a fixed value of $\theta$.

In step S5, the tracks of sputtered particles within a sputtering arrangement are calculated in accordance with the MC method using the vertical and horizontal angles of the ejected particles determined by steps S3 and S4.

Figure 3A:
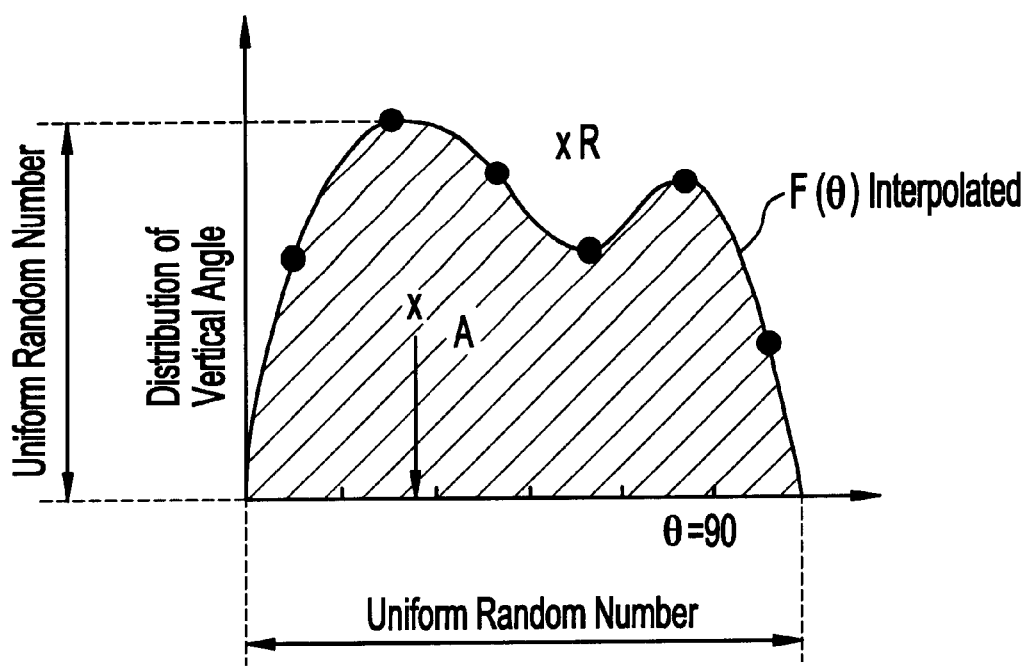
FIG. 3A is a diagram to illustrate the rejection method applied to the embodiment of the present invention and FIG. 3B is a schematic diagram to illustrate the ground on which horizontal angles are designated by uniform random numbers.
Figure 3B:
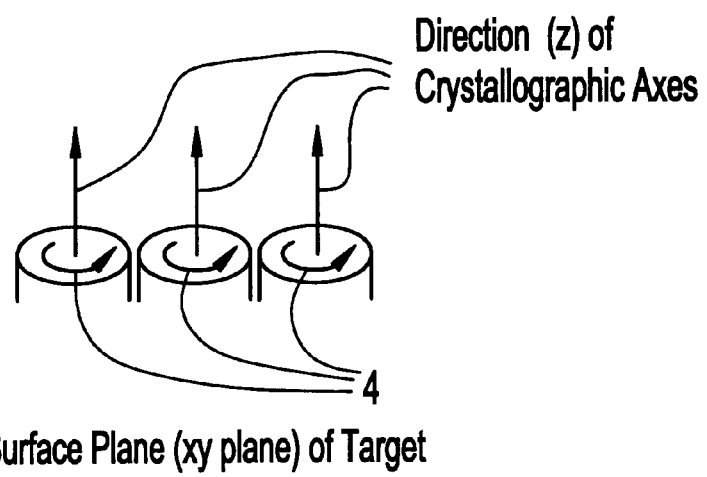

Next, we will present more detailed explanation of the operation of the present embodiment referring to FIG. 2, FIG. 3A and FIG. 3B.

FIG. 3A illustrates the method to determine the vertical angles of the ejected particles likely to emerge and FIG. 3B is a schematic diagram to illustrate the reason for the particles being ejected in an equal probability with respect to all values of $\phi$.

In the present embodiment, an argon (Ar) ion and titanium (Ti) are used as an incident ion (a bombarding ion) and target material, respectively.

In step S1, which is summarized above, about 5,000 to 10,000 tracks of incident Ar ions and Ti atoms within the target material are calculated in approximately 200 time steps (step S11). Next, it is judged whether or not the Ti atom has been sputtered (step S12). In this step, a Ti atom is regarded as sputtered when the atom is a predetermined cut-off distance apart from the surface of the target. The vertical component of the ejected direction is extracted (step P13), wherein the vertical component refers to the direction cosine with respect to the z-direction for the direction in which the Ti atom is ejected. Since $0 \leq \theta \leq 90°$, the vertical component corresponds uniquely to the vertical angle $\theta$. The extracted vertical component is stored in a data file as an ejection angle data value (step S14). It is then judged whether or not the number of ejection angle data values or the extracted vertical components reaches N (step S15). Steps S11 to S15 are repeated until the number of the extraction values reaches N (step S15). When the number of extraction values reaches N, the next step (step S2) is executed. In this step S1, the number of the data values (the vertical components) to be extracted is predetermined to be of the order of 100 to 200 as is the case with Yamada's former method in order to carry out the calculation within a practical calculation time.

In step S2, the number of the vertical components stored in the data file is counted for every section of the range of $\theta$ divided into equal intervals. The number of the vertical components counted for every section of $\theta$ is referred to as a representative intensity for the section of the vertical angle $\theta$. The discrete values of the representative intensities assigned to individual sections are interpolated by means of the spline interpolation. The continuous function obtained as a result of the spline interpolation is an experimentally-obtained (obtained by a simulated experiment) vertical distribution function $F(\theta)$.

In step S3, sets of two-dimensional uniform random numbers are generated (step S31) to be distributed over the $F(\theta)$-versus-$\theta$ plane. Here, the term two-dimensional uniform random numbers means a set of a first uniform random number and a second uniform random number. The first random number designates a value of the vertical angle $\theta$. The second random number is for comparing with the value of the vertical distribution function $F(\theta)$ for a vertical angle designated by the first random number.

It is judged next whether or not each of the random number sets is in the area enclosed between the $F(\theta)$ curve obtained by step S2 and the $\theta$-axis (step S32). The area is represented as a diagonally shaded area in FIG. 3A. The sets that fall outside the shaded area, i.e., that have the second random number greater than the value of the vertical distribution function for the corresponding vertical angle $\theta$ (cf. point R in FIG. 3A) are rejected in accordance with the rejection method. The sets that fall inside the area (cf. point A in FIG. 3A) are accepted as events of ejection that are likely to occur at angles of $\theta$ indicated by the first random numbers. In this way, the direction $\theta$ likely to emerge in every random process of an ejection of a particle is determined (step S33) in order to calculate particle tracks in the sputtering arrangement by the MC method.

In step S4, it is reasonably assumed in the present embodiment that an ejection occurs in an equal probability for any horizontal angle $\phi$ at a given $\theta$, and thus the values of the horizontal angle $\phi$ that emerge in an equal probability can be designated by uniform random numbers (steps S41 and S42). This assumption is based on the fact that the bombarding particle is perpendicularly incident on the target and that the employed target is polycrystalline with constituent microcrystals having crystal axes directed in different directions. FIG. 3B shows a surface of a target polycrystal in which one of the crystallographic axes of each constituent microcrystal is directed normal to the target surface (the z direction). Even in this configuration, other axes of the microcrystals are in randomly rotated angular positions around the vertical axes (the axes normal to the target surface, the target surface being in the xy-plane) as is shown as circular arrows in the figure. The direction in which a particle is ejected from the target depends, at least in the first order approximation, on an arrangement of the atoms in the target, provided that a bombarding particle is perpendicularly incident on the target. For this reason, the randomly rotated angular positions of the microcrystal axes are associated with an equal probability of ejection of the particle for all values of $\phi$.

In step S5, the tracks of sputtered particles after ejection are calculated by the MC method taking collisions, traps by the side wall of the apparatus and the like into consideration (step S51). Then, it is decided whether the ejected particles have arrived at a specific area on a wafer (step S52). The tracks of the particles that have arrived at the specific area are then extracted (step S53). Steps S3, S4 and 55 are repeated until the number of the data employed for the MC calculation reaches a predetermined number M (step S54). The value of the number M is taken to be ten million in order to reduce the above-described random number error.

Finally, in step S6, the shape of the area where the particles are deposited is calculated according to the string model from the tracks of the particles extracted on the wafer.

In the present embodiment, M ejection angles are generated by the uniform random numbers in order to serve as initial values for calculation of the tracks in accordance with the MC method. Because the random number error in the MC method is $1/M^{1/2}$ ($\sim 3 \times 10^{-4}$), the calculated shape of the formed film has substantially ideal and smooth form, although an error caused by dividing the range of the vertical angle $\theta$ into a finite number of sections still persists in order to limit the amount of calculation of the MD method.

For comparison, a random number error in the simulation according to Yamada's former method is $1/N^{1/2}$ ($\sim 10^{-1}$), as described above. As a result, the calculated shape of the film formed by Yamada's former method is deformed including an error of 20–30% as compared to the ideal form.

Thus, it is concluded that the method of simulation of the present embodiment offers advantages of reducing the random number error as well as realizing a precise shape of a film.

It is to be understood, however, that although the characteristics and advantages of the present invention have been set forth in the foregoing description, the disclosure is illustrative only, and changes may be made within the scope of the appended claims.

What is claimed:

1. A method of stimulating a sputtering process, wherein an ejected direction of a particle from a target is designated in polar coordinates ($\theta$, $\phi$), a vertical angle $\theta$ denoting an angle of said ejected direction with respect to a z-axis that is defined at an incident point of a bombarding particle on a surface plane of said target and is directed perpendicularly to said surface plane of said target and a horizontal angle $\phi$ denoting an angle of an intersection line with respect to an x-axis, an xy-plane being said surface plane of the target, x-axis being an arbitrarily defined axis on said xy-plane, and said intersection line being an intersection of a plane that includes both said z-axis and said ejected direction with said xy-plane comprising:

a first step of calculating a direction-dependent distribution of ejected particles from said target;

a second step of dividing a range of said vertical angle $\theta$ into sections of an equal interval, counting a number of the ejected particles for every section of said vertical angle $\theta$, and calculating a vertical distribution function by interpolating the counted numbers of the ejected particles as a function of said vertical angle $\theta$, a third step of determining values of said vertical angle $\theta$ likely to emerge in a random process of a particle ejection from said target using said vertical distribution function as a criterion to judge whether the particle ejection at said vertical angle $\theta$ is to be accepted as likely to occur or to be rejected as unlikely to occur, a fourth step of determining values of said horizontal angle $\phi$ likely to emerge in a random process of a particle ejection from said target, and a fifth step of calculating tracks of sputtered particles in a sputtering arrangement using the values of said vertical angles and said horizontal angles determined by the third step and the fourth step in accordance with the Monte Carlo method.

2. The method according to claim 1, wherein said third step includes:

a step of generating sets of random numbers, each set consisting of two random numbers, a first random number being for designating a value of said vertical angle $\theta$, and a second random number being for comparison with a value of the vertical distribution function for a vertical angle designated by said first random number;

a step of comparing said second random number with a value of said vertical distribution function for a vertical angle designated by said first random number, and judging whether or not said second random number is equal to or less than said value of said vertical distribution function; and a step of accepting said first random number as a vertical angle likely to emerge if said second random number is equal to or less than said value of said vertical distribution function for the designated vertical angle and rejecting said first random number if said second random number is more than said value of said vertical distribution function for the designated vertical angle.

3. The method according to claim 1, wherein said fourth step includes a step of designating said horizontal angle by uniform random numbers when it is conditioned that a particle is ejected from said target in an equal probability for all values of said horizontal angle $\phi$ at a fixed value of $\theta$.

4. The method according to claim 2, wherein said fourth step includes a step of designating said horizontal angle by uniform random numbers when it is conditioned that a particle is ejected from said target in an equal probability for all values of said horizontal angle $\phi$ at a fixed value of $\theta$ and said vertical distribution function is calculated by integrating a vertical distribution function for an arbitrary given horizontal angle $\phi$, with respect to $\phi$.

5. The method according to claim 4, wherein said simulation method further includes a step of judging the number of said vertical angles used in calculation according to the Monte Carlo method, and if the judged number of said vertical angles is less than a predetermined number M, repeating steps 3, 4 and 5 until said number M is attained.

6. The method according to claim 5, wherein said number M is determined so as to put a random number error occurring in the calculation of the Monte Carlo method at a tolerable minimum.

* * * * *